United States Patent [19]

Vandermeyden et al.

[11] Patent Number: 4,620,667

[45] Date of Patent: Nov. 4, 1986

[54] HOT WATER HEATING SYSTEM HAVING MINIMUM HOT WATER USE BASED ON MINIMUM WATER TEMPERATURES AND TIME OF HEATING

[75] Inventors: Tom R. Vandermeyden, Lakewood; Oscar R. Dufau, Fullerton; Frederick Blau, Jr., Fountain Valley, all of Calif.

[73] Assignee: Fluidmaster, Inc., Anaheim, Calif.

[21] Appl. No.: 827,372

[22] Filed: Feb. 10, 1986

[51] Int. Cl.$^4$ .............................................. F24H 1/00
[52] U.S. Cl. ............................... 236/20 R; 126/351; 219/330; 236/46 R
[58] Field of Search ........................ 236/46 R, 20 R; 126/351, 374; 219/330, 328, 334, 492

[56] References Cited

U.S. PATENT DOCUMENTS

| | | | |
|---|---|---|---|
| 4,508,261 | 4/1985 | Blank | 236/20 R |
| 4,522,333 | 6/1985 | Blau, Jr. et al. | 236/20 R |
| 4,535,931 | 8/1985 | Bartok et al. | 236/20 R |

Primary Examiner—William E. Wayner
Attorney, Agent, or Firm—George E. Schick

[57] ABSTRACT

A conventional hot water heating system generally of the type for heating water in multiple units of hotels, motels, schools and the like and using any heating medium has a processor and control assembly which is operationally connected to at least a water temperature sensing means and a heating control means thereof. The processor and control assembly divides the time into exact time periods, say one-half hour, and the time periods are grouped into a group of consecutive time periods, say a week. Taking any individual time period, the time periods are checked around the time period which the present time period is a repeat and time periods directly preceding the present time period, and the operational water temperature for the present time period is chosen, as well as the amount of heat required to maintain the water at that temperature on a percentage basis of heating taken from one hundred percent. In addition, the assembly exactly records the various settings throughout that particular time period and when the time period comes up again one week from now, the new settings are calculated in the same manner but using the previous time period being repeated.

36 Claims, 14 Drawing Figures

HOT WATER HEATING SYSTEM HAVING MINIMUM HOT WATER USE BASED ON MINIMUM WATER TEMPERATURES AND TIME OF HEATING

BACKGROUND OF THE INVENTION

This invention relates to a hot water heating system which has the distinct advantage of minimum hot water use based on minimum hot water temperatures and time of hot water heating. The hot water heating systems involved are basically of standard construction as commonly used at hotels, motels, schools, apartments and the like. Furthermore, according to the principles of the present invention, the hot water heating systems have certain electrical and electronic components integrated therewith which are used to properly schedule the minimum hot water temperatures and time of hot water heating so that at any given period of use such temperatures and heating are within the most efficient range. The final result is a hot water heating system of maximum overall efficiency far greater than heretofore thought possible with overall minimum total cost.

Various types of hot water heating systems are presently being used for providing the necessary heat for many structures. Although efficient heating is always a sought after criteria, the provision of heating for large, multiple unit systems is always of a prime consideration due to the relatively large requirements with improvements in efficiency being of an important consideration in the overall cost of operation. Furthermore, these multiple unit hot water heating systems make use of various types of heating fuels, for instance, various types of both natural and manufactured gas, electricity, various types of heating oils, steam and others. According to the present invention, all of these many multiple unit structures with the various types of heating systems are considered and the various inventive principles applied thereto for the various improvements.

Referring to one of the major considerations, for instance, as applied to modern structural technology, is the use of hot water heating systems for motels and the like. In the modern motel of today, the hot water system will most frequently be of a type heated by gas, electricity or oil. More important, the heating system will attempt to maintain the hot water being used for such heating at a temperature of, say, 140 degrees Fahrenheit. The overall result is that the temperature of the hot water is maintained at a relatively high temperature regardless of the time of day or night. This results in a relatively high, inefficient cost for hot water during the day and night periods when very little hot water might be used.

Many various improvements in the heating of hot water heating systems have been attempted, most of which have been usually unsuccessful. One that has met with a great degree of success is entitled SCHEDULED HOT WATER HEATING BASED ON AUTOMATICALLY PERIODICALLY ADJUSTED HISTORICAL DATA and covered by U.S. Pat. No. 4,522,333 issued on June 11, 1985. The owner of this existing patent is the owner of the present invention.

In the device of the presently existing patent, standard hot water heating systems are used and these also have certain electrical and electronic components integrated therewith for providing the overall hot water heating system. According to that prior invention, however, the makeup water from the cold water supply to the particular heating device is maintained strictly monitored, as well as the hot water temperature of the hot water as it is used. With these two items always closely monitored, it is possible for a processor and control device to maintain the heated water temperature always at a minimum level dependent on the anticipated use for that given period, for instance, one half hour periods. Although this prior hot water heating system invention has been and will continue to be extremely important and highly successful, the maintaining of control of the use directly of the make-up water is quite complex and with the use of the present invention, frequently unnecessary.

OBJECTS AND SUMMARY OF THE INVENTION

It is, therefore, an object of this invention to provide a hot water heating system having a hot water control system therefor which basically makes use of the proportionate length of time during given periods of time that the heating unit is turned "on" heating water as controlled by a water temperature sensor means measuring the water temperature as the hot water leaves the point of heating and is transmitted to the water consumption points for use. When less hot water is required, less hot water is used as denoted by the heating time, and when more hot water is required, more hot water is used as denoted by the heating time. Thus, by monitoring the amount of hot water heating required over various time periods and adjusting the desired water temperature, a minimum water heating temperature may be maintained at all times to reduce the overall heating costs and without being required to determine the quantity of water flow through the hot water heating system as was previously necessary.

It is a further object of this invention to provide a hot water heating system having a hot water control system therefor, all as previously described, which makes use of certain of the previous time periods for predicting the hot water to be used during this just started time period, while at the same time, exactly recording the proportionate time of hot water heating throughout this overall present time period. In this manner, the predicting by the previous time periods serves as the gradient of use of hot water during the present time period and the exactly recorded figures serve as at least part of certain of the time periods when these time periods repeat. In this manner, the data for the various time periods is constantly updated resulting in increased accuracy in a prediction basis.

It is still another object of this invention to provide a hot water heating system having a hot water control system therefor which satisfies at least certain of the foregoing features and as a part of the overall hot water heating may make use of stand-by heat loss predictions which are sufficiently close to be of value. As a first matter, the stand-by heat loss values can be predicted by factory engineer testing or by gaining data from testing at particular hot water heating system locations of similar units. However, it is preferred to make use of the average of certain prior time periods which are of a minimum hot water use other than stand-by heat losses, in other words, use of hot water for direct heating of certain of the water consumption points is maintained at zero and the only hot water being used is to make up stand-by heat losses. In this manner, actual experience is used of a particular unit or hot water heating system and that systems particular installation. Furthermore, if the latter method is used, any changes over a period of time can be noted and corrected so as to result in an overall more efficient stand-by heat loss program.

It is also an object of this invention to provide a hot water heating system having a hot water control system therefor which may include any or all of the foregoing features, yet if of a type having a reasonable degree of hot water storage within the system, may have certain additional water temperature sensing means therein which adds to the overall accuracy and control of the hot water control system. As an example and if this additional water temperature sensor means is used, the initial or primary water temperature sensor means is installed in the usual position at the end of the hot water storage where the hot water is ready to enter water consumption points and a secondary water temperature sensor means is installed sensitive to the water temperature near or at the inlet to the water storage, just as the water is heated and ready to pass into storage. The primary water temperature sensor means is set as usual controlling the temperature of the water as it is normally heated, but the secondary water temperature sensor means is set below that temperature, say 10 degrees Fahrenheit below. With this arrangement, the problems of "stacking" are compensated for, these being common to hot water heating with an extensive storage. In other words, when the primary sensor means cannot detect temperature decreases since they have not yet arrived at that point, and hot water is still being used from storage, the lower temperature secondary sensor means will readily detect the same and begin the water heating rather than wait until the cold water reaches the primary sensor means.

DESCRIPTION OF THE BEST EMBODIMENTS CONTEMPLATED

Figure 1:
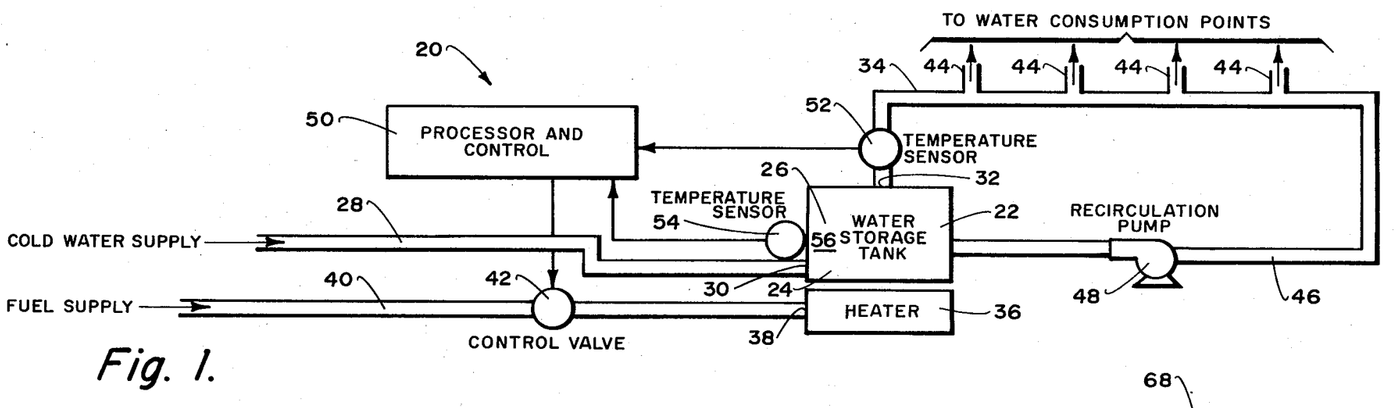
FIG. 1 is a schematic view of a typical hot water heating system incorporating the processor and control improvements of the present invention.

Referring to the drawings and particularly FIG. 1 thereof, an embodiment of the hot water heating system is generally indicated at 20 therein including the improvements of the present invention, all to be hereinafter discribed. In typical form, the improved hot water heating system may be readily adaptable to various types of uses, for instance, hotels, motels, schools, apartments and various other structures. Furthermore, the hot water heating system may make use of a multiplicity of a choice of fuels such as gas in either natural or manufactured form, electricity, various types of heating oils or by steam heated by any of the foregoing, as examples. One of the most advantageous for reaping the benefits of the present invention are, for instance, hotels or motels and a typical hot water heating system for such use is that shown in FIG. 1.

As shown in FIG. 1, the hot water heating system generally indicated at 20, for the main part, takes on the usual form including a water storage tank 22 having heating coils 24 in the lower portion thereof and a hot water storage tank 26 in the upper portion thereof. A cold water supply pipe is connected through a water inlet 30 to the entrance of the heating coils 24 and the hot water storage tank 26 is upwardly connected for hot water flow through a water outlet 32 to a distribution line 34.

A heater 36, say a natural gas heater, receives its supply of heating fluid through a fuel inlet 38 from a fuel supply line 40. The flow of fuel within the fuel supply line 38 and into the heater 36 is controlled by a unique control valve 42 to be hereinafter described more in detail. Finally, again in usual form, the outlet of the hot water in the distribution line 34 circulates to the multiplicity of water consumption points 44 for use and that not being used recirculates in a recirculation line 46 back to the hot water storage tank 26 as directed by the recirculation pump 48.

Still referring to FIG. 1 and particularly according to the prinicples of the present invention, a processor and control generally indicated at 50 is connected to the control valve 42 of the heater 36 through a connection of the control valve which turns the control valve "on" for supplying fuel to the heater and "off" for interrupting such flow. The processor and control generally indicated at 50 is also operably connected to a primary water temperature sensor means 52 and a secondary water temperature sensor means 54. The primary water temperature sensor means 52 is located at the water outlet 32 of the hot water storage tank 26 and as the hot water passes into the distribution line 34 as hereinbefore described. The secondary water temperature sensor means 54 is generally near and in this particular arrangement, at a hot water inlet 56 at the beginning of the hot water storage tank 26 at its connection to the heating coils 24 so that the water temperature detected is just after complete heating by the heating coils. The purpose of the primary and secondary temperature sensor means 52 and 54 is generally for measuring the water temperature at their particular points and transmitting that information back to the processor and control 50 as will be hereinafter more completely explained, and the purpose of having both, as opposed to merely the primary water temperature sensor means is to compensate for "stacking" of hot water within the hot water storage tank 26 as will also be more completely explained.

Figure 2:
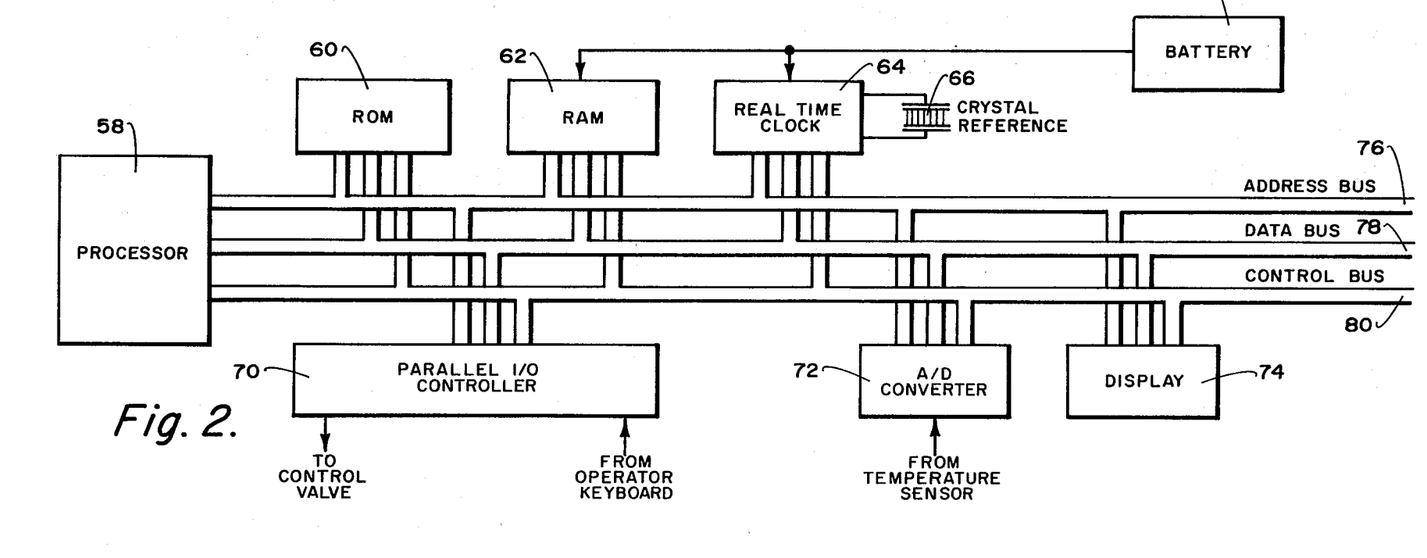
FIG. 2 is a schematic view showing the processor and control of FIG. 1 in greater detail.

The particulars of the processor and control generally indicated at 50 are clearly shown in FIG. 2 and include a processor 58, a Read Only Memory or ROM 60, a Random Access Memory or RAM 62, a Real Time Clock 64, a crystal reference 66, and emergency battery 68. Still further, the processor and control 50 includes a parallel input/output controller 70, an Analog to Digital Converter 72, and a display 74, all of these and the foregoing being tied together in proper interconnection by an address bus 76, a data bus 78 and a control bus 80.

In general terms, the processor 58 is constructed and arranged for executing the particular program which is stored in the ROM 60 and the ROM is used to store the particular program indefinitely. The RAM 62 is used to changably store the history and the various parameters, all as will be hereinafter discussed more in detail, with the Real Time Clock 64 being used to maintain time for the history recording purposes. The crystal reference 66 maintains the accuracy of the Real time Clock 64 and the battery 68 provides power to the RAM 62 and the Real time Clock 64 in the event of a power failure. The battery 68 allows the processor 58 to continue operation when power is reestablished as before the power failure, since the only information that is lost as a result of the power failure is the historical usage during the time that the power is off.

The parallel I/O controller 70 is for input and output of digital signals, the output to control the fuel control valve 42 as to "on" and "off", and the input from the operator keyboard to sense pressing of a particular key by the operator. The analog to digital converter 72 is for converting the analog signal from the water temperature sensor or sensors 52 and 54 to a digital value which is usable by the processor 58. The display 74 is to allow inspection of the various parameters such as the "on" and "off" of the heaters and the temperature or temperatures measured by the processor 58 from its temperature sensor or sensors 52 and 54. The display also shows the maximum and minimum allowable temperatures which are parameters that are entered by the operator through the operator keyboard.

Figure 3:
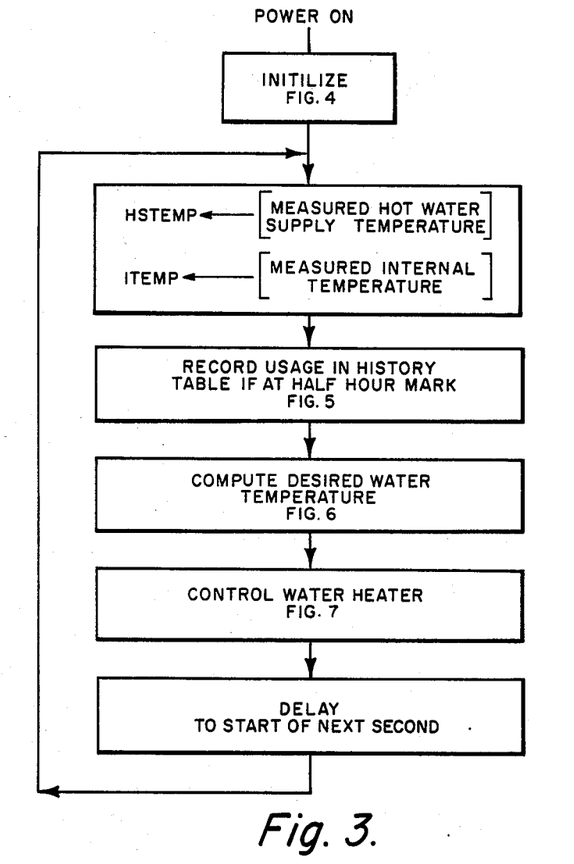
FIG. 3 is a flow chart showing the overall sequence of operation including an initialized block, a sensing usage block, a record usage block, a compute desired water temperature block, a control water heater block and a delay block, all according to a preferred embodiment thereof.

The basic use of the apparatus of FIGS. 1 and 2 is shown generally in FIG. 3, and in greater detail in FIGS. 4, 5, 6 and 7. This is done by the use of flow charts. Furthermore, there are several special terms used in the various flow charts and in certain graphs, and these are set forth below along with an illustration of compatible terminology which can be used:

TMAX—this is a temperature variable that contains the maximum allowable temperature of water which is set by the operator when the system is installed. As with all temperatures, this is in degrees Fahrenheit. TMIN—this is the same as the foregoing only the minimum allowable water temperature and is set by the operator when the system is installed. HSTEMP—the processor 58 stores this temperature of the hot water in this variable and this variable temperature is at the water outlet 32 of the hot water storage tank 26 and just entering the distribution line 34. ITEMP—the processor 58 stores the temperature of the hot water at, in this case, the beginning of the hot water storage tank 26 approximately at the hot water inlet 56, this being normally spaced below HSTEMP.

USAGE—this is a variable which is used to accumulate the number of seconds out of each half hour time period that the heater is "on". HISTORY (1 through 336)—this is an array or table of variables where a parameter is placed within the parenthesis to indicate a particular variable within the array or table. HOUR—this is a variable with maximum value of 336 where 336 is the total number of one half hour periods in seven days, and this parameter is used as a pointer in the HISTORY table above. HEATERSTATE—this is a variable with two values, "1" or "0" to indicate the particular state of the heater, "1" being "on" and "0" being "off".

HEATLOSS—this is used to store the computed radiant or stand-by heat loss, the heat lost from the stored hot water without regard to use. DEMAND—this is a variable used to store the computed hot water requirements for the present time period and for the next time period, the value being stored in seconds of heat per half hour or percent capacity per half hour. DTEMP—this is a variable which is used to store the desired hot water supply temperature. TDIF—this is a variable used to store the average difference between HSTEMP and ITEMP for the previous twenty four hours.

Referring to FIG. 3, this is the highest level flow chart and serves as an overview of the control method. When the power is turned "on", the processor and control 50 first performs the INITILIZE block of FIG. 4. The integrity of the battery backed-up memory is checked, variables are cleared and/or set as required. The temperatures are measured, HSTEMP being the temperature of the hot supply line and ITEMP being the temperature internally just after hot water heating starting into the storage tank.

Figure 5:
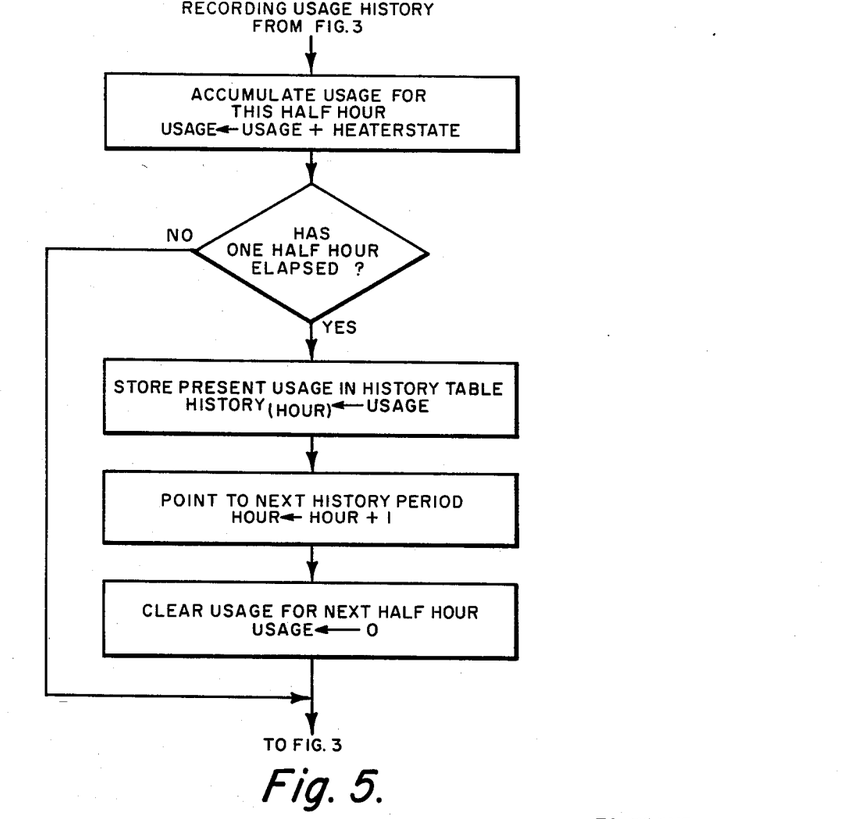
FIG. 5 is a flow chart taken from FIG. 3 and showing the recording usage history block in greater detail.

In the block of FIG. 5, the HISTORY is recorded into the memory when a one half hour period is completed. In the FIG. 6 block, the desired hot water supply temperature is computed based upon historical data and the user programmed temperature limits. In the FIG. 7 block, the decision is made as to whether the heater should be "on" or "off" based upon the desired temperature and the actual temperature. In the final block, there is provided a delay so that the loop, as shown by the arrow, is repeated at one second intervals.

Figure 4:
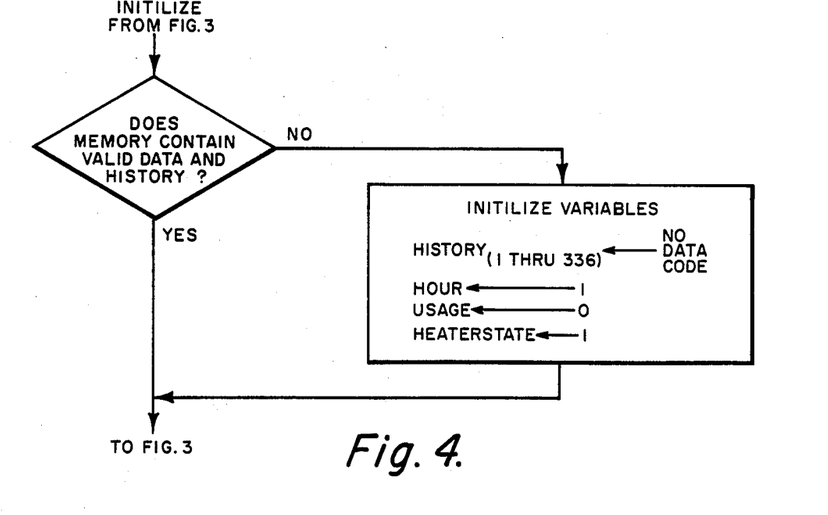
FIG. 4 is a flow chart taken from FIG. 3 and showing the record usage block in greater detail.

More particularly, referring to the specifics of FIG. 4, at initial start-up, this procedure is performed or this procedure is performed after a power failure or power interruption. In the decision block it is asked "does memory contain valid data and history?". The processor tests the memory using a checksum method. If the checksum is good, the processor continues in FIG. 3, otherwise the HISTORY table is filled with a code to indicate "no history" and "maximum consumption". In that case, the temperature will remain at maximum programmed temperature for the first seven days. Other variables are initialized and then the processing continues to FIG. 5 as indicated on FIG. 3.

Referring to FIG. 5, this procedure keeps track of the number of seconds out of each half hour that the water heater 36 is "on". The first block accumulates the number of seconds in the variable USAGE. If the HEAT- ERSTATE checks zero, nothing is done, but if the HEATERSTATE checks 1, this is added to the USAGE. Next the decision block checks if 30 minutes have elapsed and if 30 minutes have not elapsed, the processing continues to FIG. 6 in FIG. 3. At the half hour interval, the seconds are counted and USAGE is stored into the HISTORY array as pointed to by HOUR. The USAGE is then cleared for the next half hour and the HOUR pointer is incremented to point to the next location in the HISTORY array for the new time period.

Figure 6:
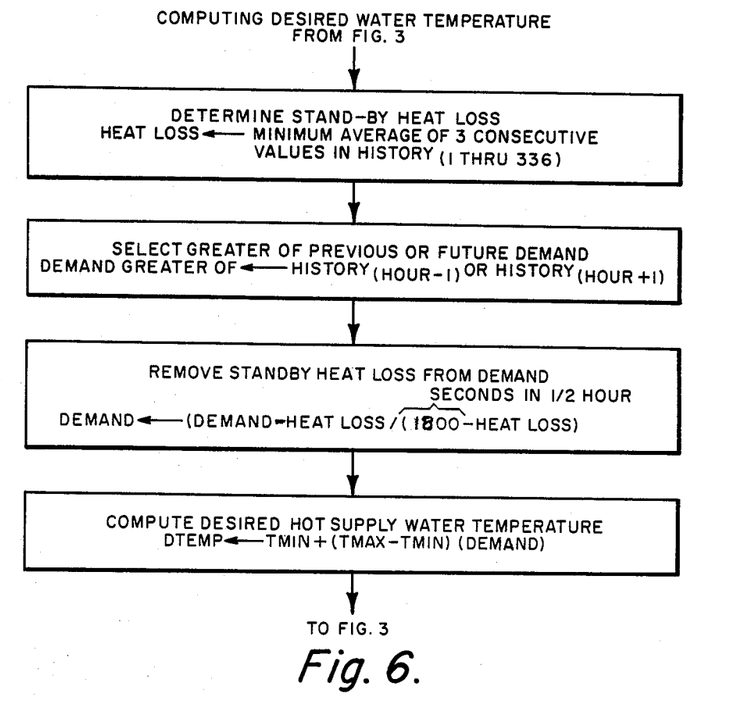
FIG. 6. is a flow chart taken from FIG. 3 and showing the compute desired water temperature block in greater detail.

Referring to FIG. 6, the procedure computes the desired hot water supply temperature for each half hour based on consumption HISTORY and USER programmed temperatures. In the first block, the stand-by or radiant heat loss denoted as HEATLOSS and it is computed by scanning the 336 half-hours consumption values and selecting the average of the least three consecutive values. Although other means could be used for finding a reasonably close HEATLOSS figure such as by engineering study of the particular type of unit and estimating heat loss or by experiments of the particular type of unit and using reasonable averages to determine the probable heat loss, the validity of the present method of stand-by heat loss is based on the assumption that in any use, there will always be at least one, ninety minute time period out of the previous seven days when no hot water was used. Considering night periods, three consecutive one half hour time periods out of the total number of time periods in seven days would appear to be a valid assumption.

In the second block of FIG. 6, the greater of the actual demand during the previous one half hour or the anticipated demand in the following half hour, that is, the one half hour period following the immediate time period seven days ago is selected. Again, other methods may be used, for instance, taking quantities at or around the one week ago period, and close to the present time period, but that used is considered reasonably accurate. In the third block, the stand-by heat loss component of the DEMAND is removed. The calculation yields a number between "0" and "1" which is proportionate to the anticipated demand where "1" is the maximum capacity of the water heating system, in other words, the heater would be one for the full 30 minutes out of 30 minutes. This value between "0" and "1" is stored in DEMAND. The desired temperature which is DTEMP is computed in the last block using the USER programmed limits of TMAX and TMIN and the temperature is set proportionately between these two limits using DEMAND, as shown in the calculations.

Figure 7:
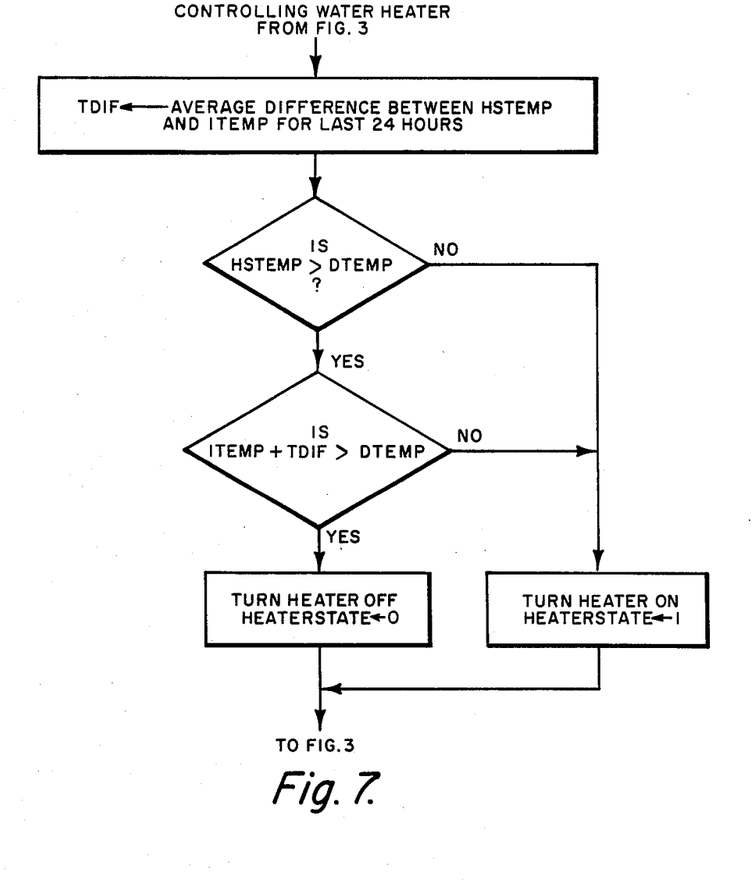
FIG. 7 is a flow chart taken from FIG. 3 and showing the control water heater block in greater detail.

Finally, referring to FIG. 7 as the last block of FIG. 3, in "controlling water heater", the decision is made to turn the water heater 36 "on" or "off". In the first block of FIG. 7, TDIF is computed by calculating the average difference between HSTEMP, the hot water supply ready for distribution to the water consumption points, and ITEMP, the hot water temperature directly after heating and immediately passing into the water storage tank, this for the previous twenty four hours. The purpose of acquiring the internal water temperature at the start of the water storage tank is to "see" cold water that may be entering the system and to get feedback on recovery of the temperature after the boiler is turned on. If only the hot water supply temperature at the upper outlet of the hot water supply tank were to be monitored, the system may fill with cold water before any decrease in temperature is noticed. The internal temperature of the water just after heating and just moving into the hot water storage tank may differ from the hot water supply temperature at the outlet of the hot water storage tank and passing into the distribution line 34 due to stratification and the like and this difference is computed by consideration in the decision to turn the heater on or off to eliminate the effect thereof.

In the next block of FIG. 7, HSTEMP is compared with DTEMP, the desired hot water supply temperature, and the heater 36 is turned "on" if the supply temperature is lower than the desired temperature. If the supply temperature is satisfied, then the internal temperature, ITEMP, is compared to DTEMP, the desired temperature with adjustment for offset, TDEF, which again is the variable used to store the average difference between HSTEMP and ITEMP for the previous twenty four hours. The water heater is turned "on" or "off" based on this comparison. The variable HEATERSTATE, the condition or state of the heater 36 as determined by the control valve 42 is also set for use back in the first block of FIG. 5, that is, in "recording usage history". The sequence then is complete and returns to the start of FIG. 3 for repeating the same.

Although the foregoing gives a full review of the construction and use of the hot water heating system 20 of the present invention, a positive example should be helpful in more clearly understanding the same. As actually used on this installation, everything is exactly the same as described in FIGS. 1 and 2 with the exception that there was a slight change in the heating coil 24, the hot water storage tank 26 and a circulation of the cold and hot water between the various elements.

Figure 10:
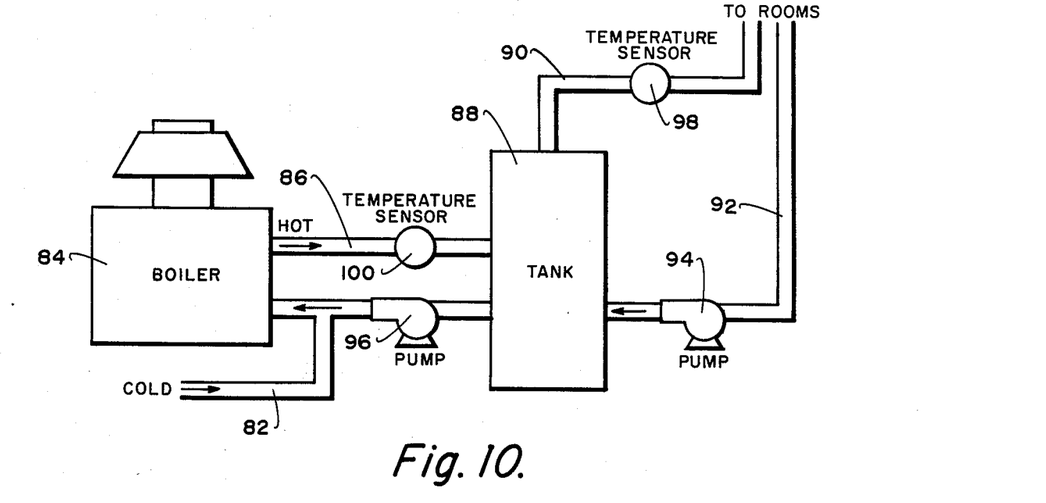
FIG. 10 is a schematic view of an installation which may have been used to create the line and bar charts of FIGS. 8 and 9, the installation having a relatively large storage tank and temperature sensors at either side.

As shown in FIG. 10, a cold water supply pipe 82 enters the lower portion of the heating coils within boiler 84 and exits at an upper point through a hot water inlet 86 to a hot water storage tank 88. The hot water exits the hot water storage tank 88 through water outlet 90 for use at the water consumption points and that that is not used is recirculated in a loop of a recirculation line 92 back to the hot water heating tank by pump 94. Furthermore, the hot water of the hot water storage tank is also pumped back to the boiler 84 by a pump 96. Finally, a primary water temperature sensor 98 is located at the water outlet 90 of the hot water storage tank 88 and a secondary water temperature sensor 100 is located at the hot water inlet 86 of the hot water storage tank. All of these elements perform their usual duties.

Now referring to the further particulars of the hot water heating system, the system consisted of a 500,000 BTU boiler 84 and a 120 gallon hot water storage tank 88. ITEMP is taken at the secondary water temperature sensor 100, ITEMP being located here because cold make-up water reaches this point quickly and the boiler 84 only contains 2 gallons of water. Also, when the boiler 84 is turned "on", recovery of the temperature is seen at this point. In this example, 40 rooms are served and the loop is over 200 feet in length and is the source of most of the stand-by heat loss. HSTEMP is taken at the primary water temperature sensor 98. The computer including the processor and control 50 controls the boiler 84 by operating an electrically operated gas valve at the control valve 42 of the fuel supply 40.

When the unit is first installed, the memory is INITILIZED as set forth in FIG. 4. The 336 elements of the HISTORY array are set to "101" to indicate that there is no history yet recorded. HOUR is set to "1" to point to the first element in HISTORY, and USAGE is set to "0" for accumulation of heater on-time for the next half hour. HEATERSTATE is set to "1" to turn the water heater on.

Processing then continues in FIG. 4. The temperatures HSTEMP, the primary water temperature sensor, and ITEMP the secondary water temperature sensor are measured. Assuming for this example that this HSTEMP and ITEMP are 135 degrees Fahrenheit and 125 degrees Fahrenheit, respectively.

Next, FIG. 5 is performed. Since the heater is "on", USAGE will contain the value "1" after the first block. The following decision block will be answered "no" because only one second has elapsed.

Proceeding to FIG. 6, HEATLOSS will be set to "0" because scanning of HISTORY will show no consumption values. All of the data is "101" indicating that no history is yet available. In the second FIG. 6, block, HISTORY (336) and HISTORY (2), back and forward respectively, both indicate that there is no history so that the maximum value is used, DEMAND equal 100. Stand-by heat loss is removed in the next block and since this loss is presently determined to be "0", DEMAND will not change, (100 minus 0)/(100 minus 0) is 1.00. DEMAND equals 1.00 and this number changes from percent to number between "0" and "1". Maximum demand is equal to 1.00 and minimum demand is 0.00, with all other demands being represented by a number proportionately between 0.00 and 1.00.

In the final block, the desired water temperature for this half four is computed. Assuming that the user programmed minimum and maximum temperatures are TMAX as 140 degrees Fahrenheit and TMIN is 110, then the desired temperature, DTEMP, for this half hour will be computed as: DTEMP is less than 110 plus the quantity (140 minus 110 times 1.00), which equals 140 degrees Fahrenheit.

Processing continues at FIG. 7, and in the first block, TDIF is computed. Since HSTEMP and ITEMP have only measured once, the average difference for twenty four hours cannot be computed. Therefore, TDIF is set to "0". In the following decision block, the actual supply temperature is compared with the desired temperature. Since 135 degrees is not greater than 140 degrees, the answer is "no". The water heater is turned "on" and the HEATERSTATE is set to "1".

Returning to FIG. 4, the loop repeats for the next second. The temperatures are remeasured, and assume they are now 145 degrees and 135 degrees, respectively, although in actual operation, they could never change this quickly and this is for example only. In FIG. 5, the first block USAGE was "1" and now becomes "2" because the heater is on. Proceeding to FIG. 6, DTEMP is computed as before because no variables used here have changed. In FIG. 7, 146 degrees is now greater than 140 degrees, DTEMP, so the second decision block is selected. ITEMP plus TDIF or 135 plus 0 is less than 140 so that the heater is again kept on. The main loop of the overall figures will continue to repeat.

Figure 13:
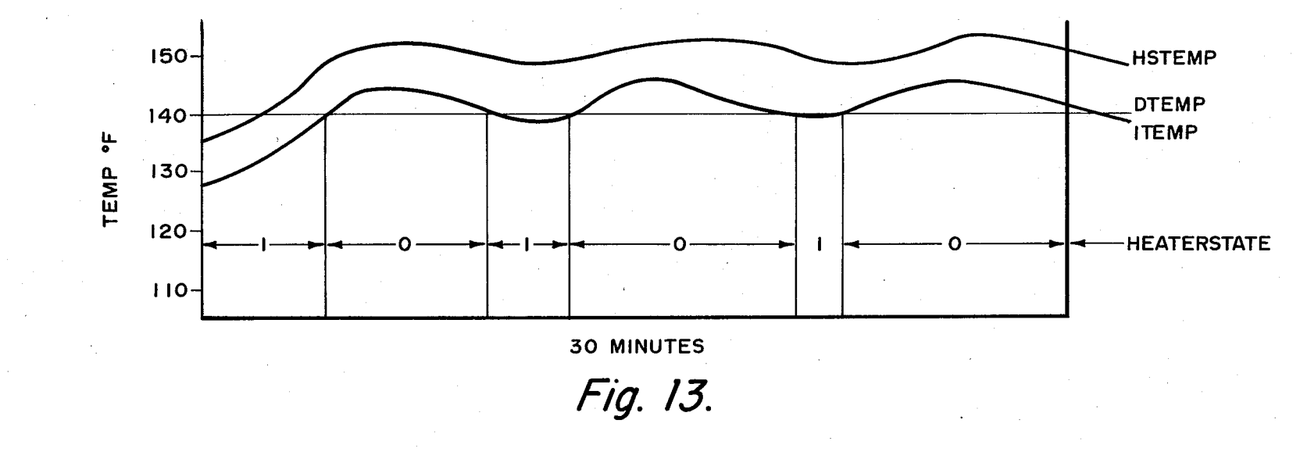
FIG. 13 is a temperature chart showing a single one half hour time period for the first half hour of operation in a typical example.

FIG. 13 is an example of the values of HSTEMP, ITEMP, DTEMP and HEATERSTATE for the first half hour of operation. At the completion of the first half hour, the decision block in FIG. 5 is answered "yes". The number in USAGE is 480 because the heater is "on" for eight minutes out of thirty minutes as shown in FIG. 13. The demand is then computed as 480 times 100 over 1800, and this computes to approximately 27 or 27 percent and this is stored in HISTORY (1). The HISTORY pointed is then incremented to "2", HOUR is less than 1 plus 1 and the USAGE variable is cleared for the next half hour. This history datum is represented in bar graph form in FIG. 9, for example, the 27 percent period could be THURSDAY EVENING at 9:30 to 10:00.

Figure 8:
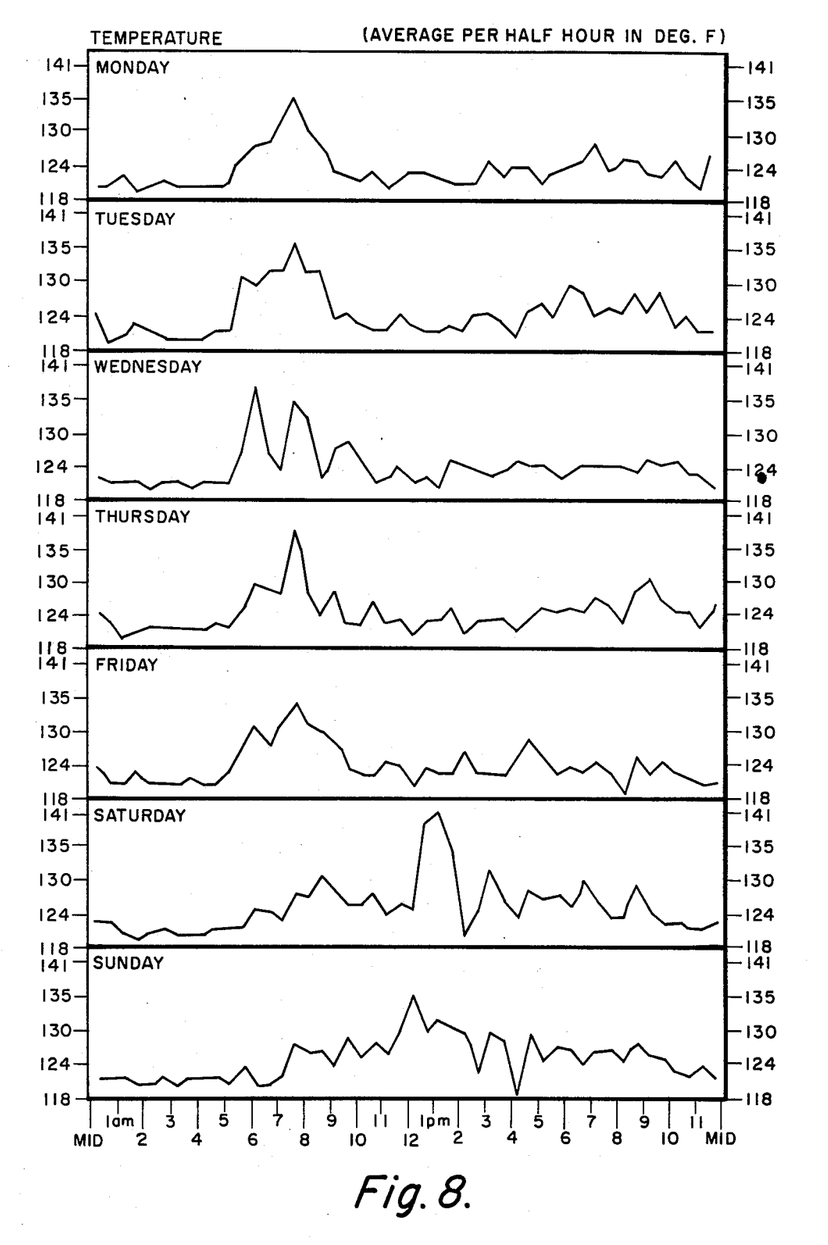
FIG. 8 is a line chart showing temperature average per half hour for an entire week for a typical installation.
Figure 9:
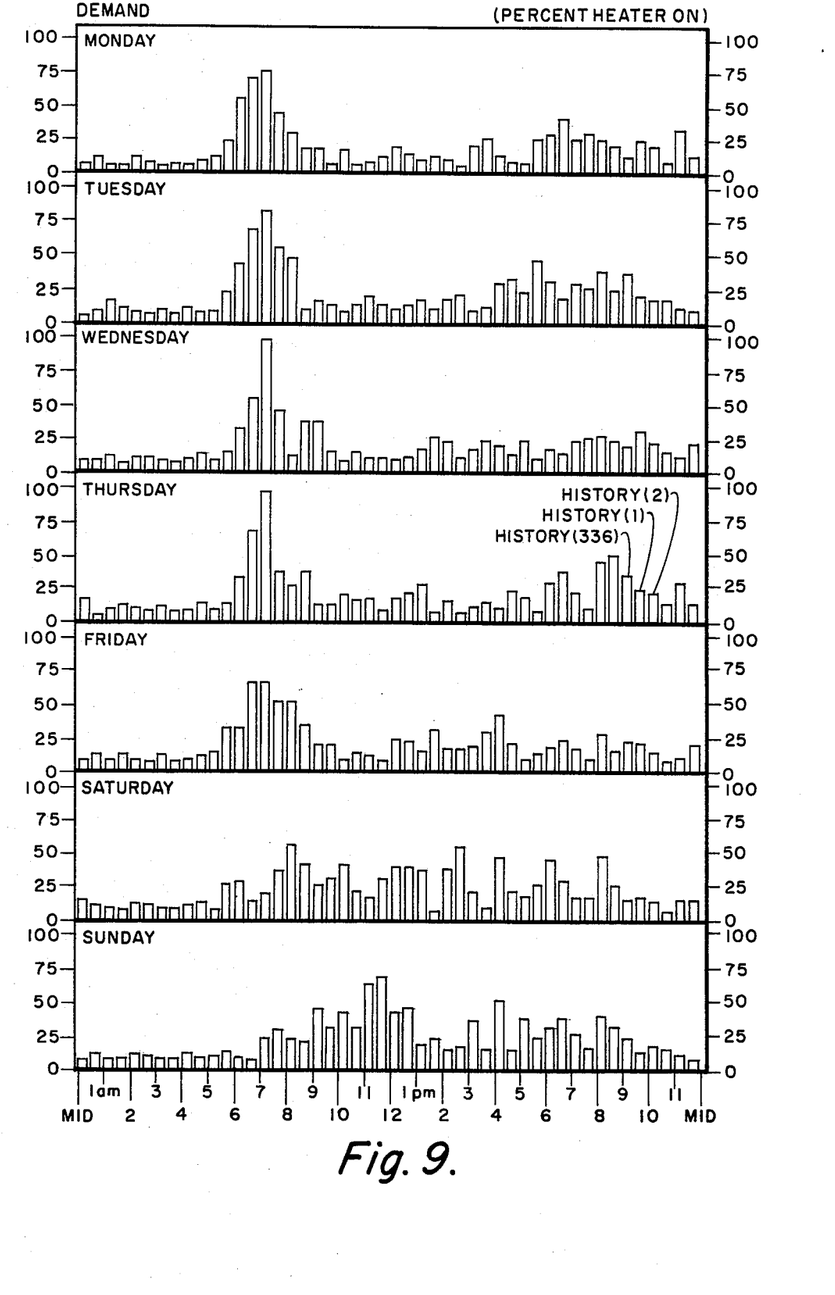
FIG. 9 is a bar chart showing demand for consumption of heat for the entire week of the installation referred to in FIG. 8.

During the remaining 335 half hour periods of the first week, this procedure will repeat for each half hour period. The actual values will vary with the consumption as shown for example in line graph of FIG. 8 and the bar graph of FIG. 9. The line graph of FIG. 8 plots the temperatures as averages per half hour in degrees Fahrenheit, and the bar graph of FIG. 9 plots the average per half hour of the percent the heater is on.

In the following half hour, for example, THURSDAY EVENING from 10:100 to 10:30, the value in USAGE at the end of the half hour is 430, which is computed to be about twenty four percent duty cycle in the FIG. 5 computation and is stored in HISTORY (2). It will be noted that the history pointer in this example starts on THURSDAY, this starting point being arbitrary and not relevant. What is important is the cycle time of the repeating pattern and that is seven days.

Figure 14:
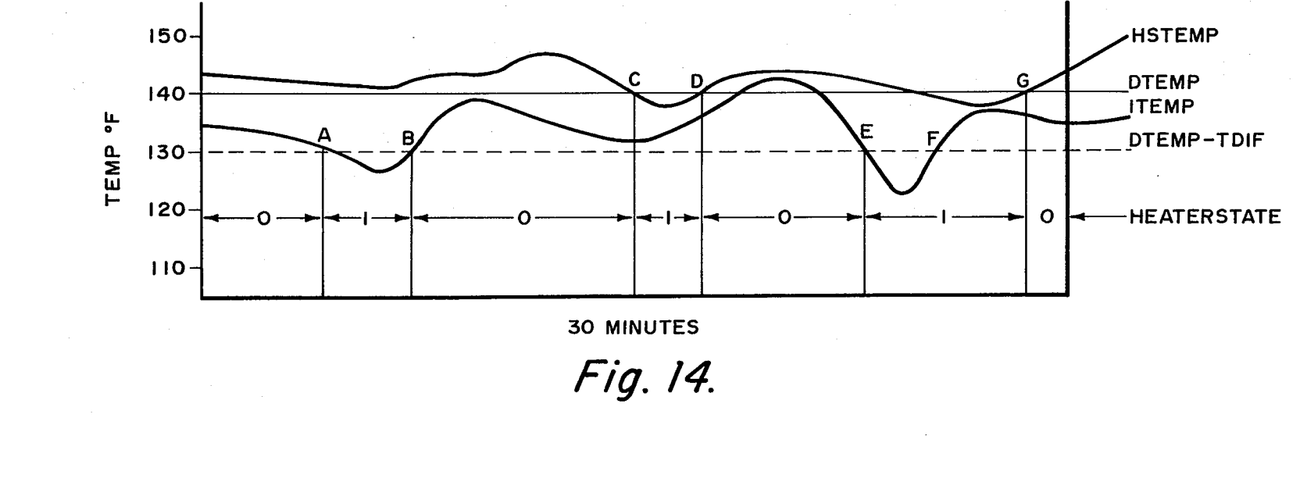
FIG. 14 is a temperature chart similar to FIG. 13, but after the first half hour of operation.

Exactly at the end of twenty four hours of operation, TDIF will be computable in a FIG. 7 computation, TDIF being used to adjust for the inherent steady-state difference between the two sensors, HSTEMP and ITEMP. FIG. 14 shows how the logic in FIG. 7 works to hold HSTEMP, the water temperature at the delivery end of the hot water storage tank, as close to DTEMP, the desired hot water temperature as possible. From the flow chart, it can be seen that either HSTEMP or ITEMP, the water temperature at the beginning or end of the hot water storage tank, can cause the heater to turn on.

Referring to FIG. 14, at points A and B, ITEMP causes the heater to be "on" for three minutes, through the second decision block of FIG. 7. At points C and D, ITEMP is satisfied, but HSTEMP drops below the desired temperature so that the heater is turned on for two minutes. At point E, HSTEMP is slightly higher than desired, however, a sudden demand has caused ITEMP to drop sharply and thereby turning on the heater for heating the water. At point F, ITEMP has recovered, but now, HSTEMP is dropping too low so that the heater stays on, this being continued until both of the temperature sensors are satisfied at Point G. The on/off decision is made in FIG. 7.

These are typical relationships between temperatures. The form will vary as a function of temperature sensor location, the type of water heater, and consumption characteristics, that is, sudden draws, steady draws and so forth. The object of this logic is to hold HSTEMP as close to DTEMP as possible.

At the end of the first week, the consumption history pattern is completed and should start to repeat when HOUR equals 1. FIGS. 8 and 9 show a typical example of a completed week of consumption data, as before stated, FIG. 8 showing a week of the average temperature each half hour in degrees Fahrenheit and FIG. 9 showing a week of the percentage the heater is on average for each half hour. The second and subsequent weeks are identical to the first, with the exception that the desired temperature, DTEMP, will no longer be a constant. During the first week, DTEMP is held constant at 140 degrees Fahrenheit. Following that first week, DTEMP will be varied between TMAX and TMIN which are 140 and 110 degrees Fahrenheit, respectively, in this particular example.

Referring to FIG. 3 overall and the more particulars of FIGS. 4 through 7, all procedures will be the same as during the first week with the exception of FIG. 6, the "computing desired water temperature". The first block of FIG. 6 computes the stand-by heat loss. By scanning the demand history table, the stand-by heatloss is computed by averaging the lowest three consecutive half hour values. In the example of the plotted FIGS. 8 and 9, this value is seven percent and this seven percent value is stored in the HEATLOSS.

In the next block, the greatest of the anticipated, the future taken from one week ago following the particular time period, or the previous demand just before this particular time period, is selective. Since this is the start of this new week HOUR equal 1, the HISTORY (336) is compared to the HISTORY (2) and the greater is selected. From FIG. 9, it is seen that these values are 35 and 24, respectively. For this reason, the value 35 is put into DEMAND. The temperature should be set with the consideration that operation will be at 35 percent of capacity, but first, the effect of stand-by heat loss must be removed. DEMAND is less than the quantity 35 minus 7 over the quantity 100 minus 7 and this equals approximately thirty percent. This equation proportionately removes the effect of stand-by heat loss.

In the final block of FIG. 6, the desired temperature is computed. DTEMP is less than 110 plus the quantity 140 minus 110 multiplied by 0.30 which equals 119 degrees Fahrenheit. The water heater is then controlled during the following half hour to maintain the temperature at 119 degrees Fahrenheit as was done during the first week, only then at the top limit temperature of 140 degrees Fahrenheit. The main loop of FIG. 3 and its supplementary FIGS. 4 through 7 will repeat indefinitely, the DTEMP will be set for each half hour according to the demand as described above.

From the example as plotted in FIGS. 8 and 9, the temperature was held constant during the first week and the heater was "on" 27 percent of the time. During the last week, the temperature is controlled between a low of 118 and a high of 141 degrees Fahrenheit, respectively. By maintaining these lower temperatures, the heater was only required to be "on" about 20 percent of the time. This represents about a 26 percent reduction in fuel consumption.

Figure 11:
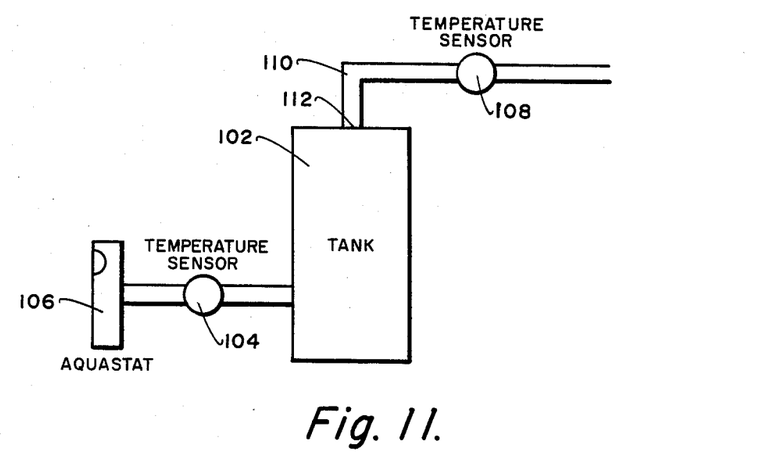
FIG. 11 is a schematic view of another typical installation wherein the boiler forms part of the storage tank and although the primary temperature sensor is at the outlet of the storage tank, the secondary temperature sensor is at the entrance side at the aquastat control.
Figure 12:
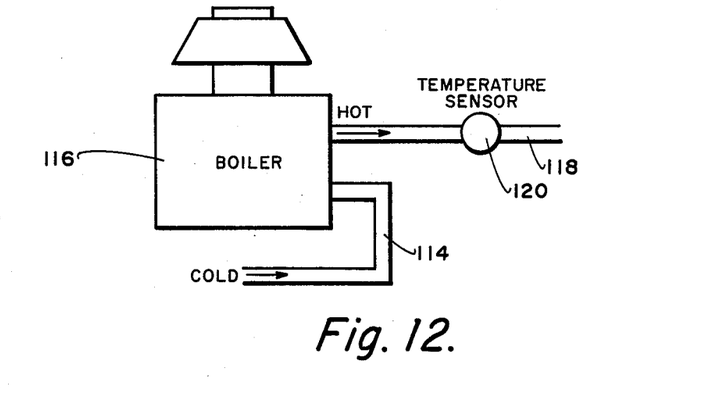
FIG. 12 is still another typical installation wherein the boiler is instantaneous without a storage tank and only the usual primary sensor is used.

In FIGS. 11 and 12, other embodiments of the hot water heating system 20 are shown to meet particular requirements. As shown in FIG. 11, many hot water heating systems have the location of the start of the hot water storage hidden from access, that is, where ITEMP must be measured is hidden. In this case, ITEMP is measured with a special temperature sensor that is mounted to the immersion well of an aquastat control on the hot water storage tank. As shown in FIG. 11, hot water storage tank 102 has the secondary water temperature sensor means 104 at the aquastat 106, a primary water temperature sensor means 108 being at usual position on the distribution line 110 at or near the water outlet 112.

In FIG. 12, the embodiment shown is an instantaneous water heater without storage for hot water. As shown, cold water enters through cold water supply pipe 114 into an instant heating boiler 116. The heated water is then directed into a distribution line 118 for immediate use at water consumption points (not shown). The only temperature sensor required with this construction is the primary water temperature sensor means 120 since the heating and use is instantaneous and there can never be any problem with "stacking" or stratification.

The primary benefit of the improved hot water heating system of the present invention is that most obvious, energy savings with a relatively simple construction. However, in addition to that benefit, there is the additional benefits of data acquistion for hot water heating system study and development. As can be seen from the graphs of FIGS. 8 and 9, the actual average temperature during each half hour for the past seven days is retained in memory and can be printed out by the simple connection of this mechanism to the well known printing computer. This allows verification of proper operation. Further, the temperature is actually increased during peak usage periods and lowered to minimum during low usage periods. Thus, constant study and improvement can be provided.

Although preferred embodiments of the improved hot water heating system of the present invention have been illustrated and described herein, it is obvious to those skilled in the art that any of the improvements disclosed herein may be used separately and at least a part of the advantages obtained therefrom. Furthermore, it is not intended to limit the principles of the present invention to the specific embodiments shown, but rather such prinicples should be broadly construed and only modified within the express limitations of the appended claims, including the patent equivalents thereof.

We claim:

1. In a water heater contol system for constantly controlling the heating and use of hot water from a water heater unit of the type having water heater means with a water heater control means therefor converting between on for heating water and off free of heating water, water inlet means for feeding water to the water heater means to be heated, water outlet means for feeding heated water from the water heater means, water distribution means operably connected to the water outlet means for distributing hot water to be used; the water heater control system further including: water temperature sensor means at least operably connected to said water outlet means for sensing the temperature of the water ready to flow to said water distribution means; processor and control means operationally connected to said water temperature sensor means and said water heating control means for determining the start of a particular time period which is one of a definite group of consecutive time periods and each is a repeat of the same one of preceding groups of time periods, for setting a generally exact water temperature above a given minimum water temperature for said water temperature sensor means and an overall portion of on time out of full time for said water heater control means as regulated on and off by the temperature sensed by said water temperature sensor means for throughout said particular time period exactly according to the overall average of actual settings recorded in actual use during at least certain of a previous of said same one of a previous group of time periods and those close to said previous group of time periods and those closely approaching said present particular time period, for actually recording directly exactly as they occur of water temperatures for said water temperature sensor means and portions of time for said water heater control means throughout and according to actual use of said water temperature sensor means and said water heater control means during the particular time period, for repeating for each succeeding of said group of consecutive time periods to the end thereof, for starting and continuing use of a next group of consecutive time periods followed by continuing with following groups of consecutive time periods and based on the average of the present actually recorded settings of said certain of said previous same one and those close to said previous same one and those closely approaching said then present particular time period.

2. In a water heater control system as defined in claim 1 in which said settings associated with said processor and control means for said water temperature sensor means and said water heating control means are exactly according to the overall average of actual settings recorded in actual use during at least certain of those closely following said same one of said previous group of time periods and those closely approaching said present particular time period.

3. In a water heater control system as defined in claim 1 in which said settings associated with said processor and control means for said water temperature sensor means and said water heating control means are exactly according to the overall average of actual settings recorded in actual use during at least certain of the two closely following said same one of said previous group of time periods and the two closely approaching said present particular time period.

4. In a water heater control system as defined in claim 1 in which said settings associated with said processor and control means for said water temperature sensor means and said water heating control means are exactly according to the larger of actual settings recorded in actual use during the two following said same one of a previous group of time periods and the two directly preceding said present particular time period.

5. In a water heater control system as defined in claim 1 in which said settings associated with said processor and control means for said water temperature sensor means and said water heating control means are exactly according to the larger of the actual settings recorded in actual use during that following said same one of a previous group of time periods and that directly preceding said present particular time period.

6. In a water heater control system as defined in claim 1 in which said settings associated with said processor and control means for said water temperature sensor means and said water heating control means include the elimination of stand-by heat loss prior to using said settings.

7. In a water heater control system as defined in claim 1 in which said settings associated with said processor and control means for said water temperature sensor means and said water heating control means include the elimination of stand-by heat loss as determined by certain previously recorded data prior to using said settings.

8. In a water control system as defined in claim 1 in which said settings associated with said processor and control means for said water temperature sensor means and said water heating control means include the elimination of stand-by heat loss as determined by the average of certain previous full time period recordings prior to using said settings.

9. In a water heater control system as defined in claim 1 in which said settings associated with said processor and control means for said water temperature sensor means and said water heating control means include the elimination of stand-by heat loss from said settings as determined by the average of three consecutive lowest full time period recordings during approximately a one week period prior to using said settings.

10. In a water heater control system as defined in claim 1 in which said water heater means of said water heater unit includes a hot water storage tank beyond a hot water heater with said hot water storage tank having a tank inlet connected to said hot water heater and a tank outlet connected to said water outlet means; in which said water temperature sensor means is a primary water temperature sensor means and is located generally between said tank outlet and said water outlet means; in which a secondary water temperature sensor means is located generally associated with said hot water storage tank generally toward said tank inlet; and in which said processor and control means regulates said primary water temperature sensor means to operate said water heater control means between on and off at particular temperatures and said secondary water temperature sensor means to operate said water heater control means between on and off at temperatures spaced below said particular temperatures, said secondary water sensor means operating said water heater control means to on despite said primary water sensor means operating to off as regulated by said temperatures.

11. In a water heater control system as defined in claim 1 in which said water heater means of said water heater unit includes a hot water storage tank beyond a hot water heater with said hot water storage tank having a tank inlet connected to said hot water heater and a tank outlet connected to said water outlet means; in which said water temperature sensor means is a primary water temperature sensor means and is located generally between said tank outlet and said water outlet means; in which a secondary water temperature sensor means is located generally associated with said hot water storage tank generally toward said tank inlet; and in which said processor and control means regulates said primary water temperature sensor means to operate said water heater control means between on and off at particular temperatures and said secondary water temperature sensor means to operate said water heater control means between on and off at temperatures spaced below said particular temperatures and determined by averaging the temperatures for said secondary water temperature sensor means over a preceding time limit, said secondary water sensor means operating said water heater control means to on despite said primary water sensor means operating to off as regulated by said temperatures.

12. In a water heater control system as defined in claim 1 in which said water heater means of said water heater unit includes a hot water storage tank beyond a hot water heater with said hot water storage tank having a tank inlet connected to said hot water heater and a tank outlet connected to said water outlet means; in which said water temperature sensor means is a primary water temperature sensor means and is located generally between said tank outlet and said water outlet means; in which a secondary water temperature sensor means is located generally associated with said hot water storage tank generally toward said tank inlet; and in which said processor and control means regulates said primary water temperature sensor means to operate said water heater control means between on and off at particular temperatures and said secondary water temperature sensor means to operate said water heater control means between on and off at temperatures spaced below said particular temperatures and determined by an average of temperatures of said secondary water temperature sensor means over the preceding twenty four hour period, said secondary water sensor means operating said water heater control means to on despite said primary water sensor means operating to off as regulated by said temperatures.

13. In a water heater control system as defined in claim 1 in which said water heater means of said water heater unit includes a hot water storage tank beyond a hot water heater with said hot water storage tank having a tank inlet connected to said hot water heater and a tank outlet connected to said water outlet means; in which said water temperature sensor means is a primary water temperature sensor means and is located generally between said tank outlet and said water outlet means; in which a secondary water temperature sensor means is located generally associated with said hot water storage tank generally at said tank inlet; and in which said processor and control means regulates said primary water temperature sensor means to operate said water heater control means between on and off at particular temperatures and said secondary water temperature sensor means to operate said water heater control means between on and off at temperatures spaced below said particular temperatures, said secondary water sensor means operating said water heater control means to on despite said primary water sensor means operating to off as regulated by said temperatures.

14. In a water heater control system as defined in claim 1 in which said water heater means of said water heater unit includes a hot water storage tank beyond a hot water heater with said hot water storage tank having a tank inlet connected to said hot water heater and a tank outlet connected to said water outlet means; in which said water temperature sensor means is a primary water temperature sensor means and is located generally between said tank outlet and said water outlet means; in which a secondary water temperature sensor means is located generally associated with said hot water storage tank generally at said tank inlet; and in which said processor and control means regulates said primary water temperature sensor means to operate said water heater control means between on and off at particular temperatures and said secondary water temperature sensor means to operate said water heater control means between on and off at temperatures spaced below said particular temperatures and determined by an average of temperatures of said secondary water temperature sensor means over the preceding twenty four hour period, said secondary water sensor means operating said water heater control means to on despite said primary water sensor means operating to off as regulated by said temperatures.

15. In a water heater control system as defined in claim 1 in which said settings associated with said processor and control means for said water temperature sensor means and said water heating control means are exactly according to the overall average of actual settings recorded in actual use during at least certain of those closely following said same one of said previous group of time periods and those closely approaching said present particular time period; and in which said settings associated with said processor and control means for said water temperature sensor means and said water heating control means include the elimination of stand-by heat loss as determined by certain previously recorded data prior to using said settings.

16. In a water heater control system as defined in claim 1 in which said settings associated with said processor and control means for said water temperature sensor means and said water heating control means include the elimination of stand-by heat loss as determined by certain previously recorded data prior to using said settings; in which said water heater means of said water heater unit includes a hot water storage tank beyond a hot water heater with said hot water storage tank having a tank inlet connected to said hot water heater and a tank outlet connected to said water outlet means; in which said water temperature sensor means is a primary water temperature sensor means and is located generally between said tank outlet and said water outlet means; in which a secondary water temperature sensor means is located generally associated with said hot water storage tank generally toward said tank inlet; and in which said processor and control means regulates said primary water temperature sensor means to operate said water heater control means between on and off at particular temperatures and said secondary water temperature sensor means to operate said water heater control means between on and off at temperatures spaced below said particular temperatures and determined by averaging the temperatures for said secondary water temperature sensor means over a preceding time limit, said secondary water sensor means operating said water heater control means to on despite said primary water sensor means operating to off as regulated by said temperatures.

17. In a water heater control system as defined in claim 1 in which said settings associated with said processor and control means for said water temperature sensor means and said water heating control means include the elimination of stand-by heat loss prior to using said settings; in which said water heater means of said water heater unit includes a hot water storage tank beyond a hot water heater with said hot water storage tank having a tank inlet connected to said hot water heater and a tank outlet connected to said water outlet means; in which said water temperature sensor means is a primary water temperature sensor means and is located generally between said tank outlet and said water outlet means; in which a secondary water temperature sensor means is located generally associated with said hot water storage tank generally toward said tank inlet; and in which said processor and control means regulates said primary water temperature sensor means to operate said water heater control means between on and off at particular temperatures and said secondary water temperature sensor means to operate said water heater control means between on and off at temperatures spaced below said particular temperatures, said secondary water sensor means operating said water heater control means to on despite said primary water sensor means operating to off as regulated by said temperatures.

18. In a water heater control system as defined in claim 1 in which said settings associated with said processor and control means for said water temperature sensor means and said water heating control means are exactly according to the larger of the actual settings recorded in actual use during that following said same one of a previous group of time periods and that directly preceding said present particular time period; in which said settings associated with said processor and control means for said water temperature sensor means and said water heating control means include the elimination of stand-by heat loss from said settings as determined by the average of three consecutive lowest full time period recordings during approximately a one week period prior to using said settings; in which said water heater means of said water heater unit includes a hot water storage tank beyond a hot water heater with said hot water storage tank having a tank inlet connected to said hot water heater and a tank outlet connected to said water outlet means; in which said water temperature sensor means is a primary water temperature sensor means and is located generally between said tank outlet and said water outlet means; in which a secondary water temperature sensor means is located generally associated with said hot water storage tank generally at said tank inlet; and in which said processor and control means regulates said primary water temperature sensor means to operate said water heater control means between on and off at particular temperatures and said secondary water temperature sensor means to operate said water heater control means between on and off at temperatures spaced below said particular temperatures, said secondary water sensor means operating said water heater control means to on despite said primary water sensor means operating to off as regulated by said temperatures.

19. In a method of constantly controlling the heating and use of hot water as provided by a water heating system; the steps of: beginning a particular time period which is one of a definite group of consecutive time periods and each is the repeat of the same one of a preceding group of time periods; at said beginning of said particular time period and to remain throughout said particular time period, setting said water heating system to produce hot water having a water temperature a determined amount above a minimum water temperature by use of a water heater over a portion of the total time less than said total time by choosing at least certain of the average of exact recorded temperatures as actually used on a total period averaged basis of the last previous of said particular time period and those close to said previous time period and those closely approaching said present particular time period; throughout said particular time period, recording the actual temperatures of the water being used and the portion of the water heater that is used to create said temperatures; continuing in the same manner in order with following of particular time periods until the end of said definite group of consecutive time periods; starting on a next group of time periods and following with other groups of time periods in order and always originally at the beginning of each time period, setting said water temperature from actual prior use in the same manner and then recording the actual water temperatures and the portions of the water heater that is used.

20. In a method as defined in claim 19 in which said step of at said beginning of said particular time period and to remain throughout said particular time period includes choosing at least certain of the average of exact recorded temperatures as actually used on a total period averaged basis of those close to said previous time period and those closely approaching said present particular time period.

21. In a method as defined in claim 19 in which said step of at said beginning of said particular time period and to remain throughout said particular time period includes choosing at least certain of the average exact recorded temperatures as actually used on a total period averaged basis of the two after said previous time period and the two exactly preceding said present particular time period.

22. In a method as defined in claim 19 in which said step of at said beginning of said particular time period and to remain throughout said particular time period includes choosing the larger of the exact recorded temperatures as actually used on a total period average basis of the two following said previous time period and the two approaching said present particular time period.

23. In a method as defined in claim 19 in which said step of at said beginning of said particular time period and to remain throughout said particular time period includes choosing the larger of the average of exact recorded temperatures as actually used on a total period average basis taken from the single time period following said previous time period and the time period approaching said present particular time period.

24. In a method as defined in claim 19 in which said step of at said beginning of said particular time period and to remain throughout said particular time period, setting said water heater system includes the first elimination of a general stand-by heat loss.

25. In a method as defined in claim 19 in which said step of at said beginning of said particular time period and to remain throughout said particular time period, setting said water heater system includes the first elimination of a general stand-by heat loss, said general stand-by heat loss being calculated from certain previously recorded data.

26. In a method as defined in claim 19 in which said step of at said beginning of said particular time period and to remain throughout said particular time period, setting said water heater system includes the first elimination of a general stand-by heat loss, said general stand-by heat loss being calculated by using the total heat for an average of the heat used in certain previous time periods.

27. In a method as defined in claim 19 in which said step of at said beginning of said particular time period and to remain trhoughout said particular time period, setting said water heater system includes the first elimination of a general stand-by heat loss, said general stand-by heat loss being calculated by taking the average of the heat used above said minimum temperature in three consecutive lowest previous time periods over a one week period.

28. In a method as defined in claim 19 in which said step of throughout said particular time period, recording the actual temperatures includes additionally noting the temperature of the water at an earlier point toward the beginning of a water storage tank and at any time said water temperature drops below a temperature spaced below said temperature being recorded, initiating said water heating system to heat and record said heating until said water temperature is above said lower temperature without regard to the temperature of the water being recorded and actually used.

29. In a method as defined in claim 19 in which said step of throughout said particular time period, recording the actual temperatures includes additionally noting the temperature of the water at an earlier point toward the beginning of a water storage tank and at any time said water temperature drops below a temperature spaced below said temperature being recorded, initiating said water heating system to heat and record said heating until said water temperature is above said lower temperature without regard to the temperature of the water being recorded and actually used, said temperature spaced below said temperature being recorded being calculated from data from actual use of previous time periods.

30. In a method as defined in claim 19 in which said step of throughout said particular time period, recording the actual temperatures includes additionally noting the temperature of the water at an earlier point toward the beginning of a water storage tank and at any time said water temperature drops below a temperature spaced below said temperature being recorded, initiating said water heating system to heat and record said heating until said water temperature is above said lower temperature without regard to the temperature of the water being recorded and actually used, said temperature spaced below said temperature being recorded being calculated from an average of that same temperature for the actual use of previous time periods over a twenty four hour period of time periods.

31. In a method as defined in claim 19 in which said step of throughout said particular time period, recording the actual temperature includes additionally noting the temperature of the water at an earlier point generally at the beginning of a water storage tank and at any time said water temperature drops below a temperature spaced below said temperature being recorded, initiating said water heating system to heat and record said heating until said water temperature is above said lower temperature without regard to the temperature of the water being recorded and actually used.

32. In a method as defined in claim 19 in which said step of at said beginning of said particular time period and to remain throughout said particular time period, setting said water heater system includes the first elimination of a general stand-by heat loss; in which said step of throughout said particular time period, recording the actual temperatures includes additionally noting the temperature of the water at an earlier point toward the beginning of a water storage tank and at any time said water temperature drops below a temperature spaced below said temperature being recorded, initiating said water heating system to heat and record said heating until said water temperature is above said lower temperature without regard to the temperature of the water being recorded and actually used.

33. In a method as defined in claim 19 in which said step of at said beginning of said particular time period and to remain throughout said particular time period includes choosing at least certain of the average of exact recorded temperatures as actually used on a total period averaged basis of those close to said previous time period and those closely approaching said present particular time period; in which said step of at said beginning of said particular time period and to remain throughout said particular time period, setting said water heater system includes the first elimination of a general stand-by heat loss, said general stand-by heat loss being calculated by using the total heat for an average of the heat used in certain previous time periods; in which said step of throughout said particular time period, recording the actual temperatures includes additionally noting the temperature of the water at an earlier point toward the beginning of a water storage tank and at any time said water temperature drops below a temperature spaced below said temperature being recorded, initiating said water heating system to heat and record said heating until said water temperature is above said lower temperature without regard to the temperature of the water being recorded and actually used, said temperature spaced below said temperature being recorded being calculated from data from actual use of previous time periods.

34. In a method as defined in claim 19 in which said step of at said beginning of said particular time period and to remain throughout said particular time period includes choosing at least certain of the average exact recorded temperatures as actually used on a total period averaged basis of the two after said previous time period and the two exactly preceding said present particular time period; in which said step of at said beginning of said particular time period and to remain throughout said particular time period, setting said water heater system includes the first elimination of a general stand-by heat loss, said general stand-by heat loss being calculated by using the total heat for an average of the heat used in certain previous time periods; in which said step of throughout said particular time period, recording the actual temperatures includes additionally noting the temperature of the water at an earlier point toward the beginning of a water storage tank and at any time said water temperature drops below a temperature spaced below said temperature being recorded, initiating said water heating system to heat and record said heating until said water temperature is above said lower temperature without regard to the temperature of the water being recorded and actually used, said temperature spaced below said temperature being recorded being calculated from data from actual use of previous time periods.

35. In a method as defined in claim 19 in which said step of at said beginning of said particular time period and to remain throughout said particular time period includes choosing the larger of the exact recorded temperatures as actually used on a total period average basis of the two following said previous time period and the two approaching said present particular time period; in which said step of at said beginning of said particular time period and to remain throughout said particular time period, setting said water heater system includes the first elimination of a general stand-by heat loss, said general stand-by heat loss being calculated by using the total heat for an average of the heat used in certain previous time periods; in which said step of throughout said particular time period, recording the actual temperatures includes additionally noting the temperature of the water at an earlier point toward the beginning of a water storage tank and at any time said water temperature drops below a temperature spaced below said temperature being recorded, initiating said water heating system to heat and record said heating until said water temperature is above said lower temperature without regard to the temperature of the water being recorded and actually used, said temperature spaced below said temperature being recorded being calculated from an average of that same temperature for the actual use of previous time periods over a twenty four hour period of time periods.

36. In a method as defined in claim 19 in which said step of at said beginning of said particular time period and to remain throughout said particular time period includes choosing the larger of the average of exact recorded temperatures as actually used on a total period average basis taken from the single time period following said previous time period and the time period approaching said present particular time period; in which said step of at said beginning of said particular time period and to remain throughout said particular time period, setting said water heater system includes the first elimination of a general stand-by heat loss, said general stand-by heat loss being calculated by taking the average of the heat used above said minimum temperature in three consecutive lowest previous time periods over a one week period; in which said step of throughout said particular time period, recording the actual temperatures includes additionally noting the temperature of the water at an earlier point generally at the beginning of a water storage tank and at any time said water temperature drops below a temperature spaced below said temperature being recorded, initiating said water heating system to heat and record said heating until said water temperature is above said lower temperature without regard to the temperature of the water being recorded and actually used, said temperature spaced below said temperature being recorded being calculated from an average of that same temperature for the actual use of previous time periods over a twenty four hour period of time periods.

* * * * *